United States Patent
Yoon et al.

(10) Patent No.: US 10,772,048 B2
(45) Date of Patent: *Sep. 8, 2020

(54) METHOD AND DEVICE FOR REAL TIME TRANSMISSION POWER CONTROL IN WIRELESS COMMUNICATION SYSTEM

(71) Applicant: Samsung Electronics Co., Ltd., Suwon-si, Gyeonggi-do (KR)

(72) Inventors: Jisun Yoon, Hwaseong-si (KR); Hanseok Kim, Seoul (KR); Byoungha Yi, Seoul (KR); Bongchan Kim, Suwon-si (KR); Intaek Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,815

(22) Filed: May 14, 2019

(65) Prior Publication Data

US 2019/0268858 A1    Aug. 29, 2019

Related U.S. Application Data

(63) Continuation of application No. 14/699,210, filed on Apr. 29, 2015, now Pat. No. 10,292,118.

(30) Foreign Application Priority Data

May 2, 2014    (KR) .................. 10-2014-0053271

(51) Int. Cl.
*H04W 72/04*    (2009.01)
*H04W 52/34*    (2009.01)
(Continued)

(52) U.S. Cl.
CPC ......... *H04W 52/343* (2013.01); *H04W 28/08* (2013.01); *H04W 52/143* (2013.01);
(Continued)

(58) Field of Classification Search
CPC . H04W 52/343; H04W 52/18; H04W 52/247; H04W 52/143; H04W 28/08; H04W 52/367
See application file for complete search history.

(56) References Cited

U.S. PATENT DOCUMENTS 6,690,939 B1    2/2004    Jonsson et al.
8,311,570 B2    11/2012    Richardson
(Continued)

FOREIGN PATENT DOCUMENTS

CN    102656927 A    9/2012
EP    2 892 273 A1    7/2015
(Continued)

OTHER PUBLICATIONS

European Search Report dated Oct. 19, 2017, issued in the European Application No. 15785238.5-1875 / 3138331.
(Continued)

*Primary Examiner* — Lan-Huong Truong
(74) *Attorney, Agent, or Firm* — Jefferson IP Law, LLP

(57) ABSTRACT

A method and device for real time transmission power control in a wireless communication system are provided. The method includes receiving transmission power control related information from at least one base station, generating transmission power control information for load balancing of the at least one base station based on the transmission power control related information, and controlling the transmission power of the at least one base station based on the transmission power control information.

20 Claims, 8 Drawing Sheets

(51) Int. Cl.
*H04W 52/18* (2009.01)
*H04W 28/08* (2009.01)
*H04W 52/14* (2009.01)
*H04W 52/24* (2009.01)
*H04W 52/36* (2009.01)
*H04W 52/40* (2009.01)

(52) U.S. Cl.
CPC ......... *H04W 52/18* (2013.01); *H04W 52/247* (2013.01); *H04W 52/367* (2013.01); *H04W 52/40* (2013.01)

(56) References Cited

U.S. PATENT DOCUMENTS

| | | | |
|---|---|---|---|
| 8,369,271 B2 | 2/2013 | Borst et al. | |
| 8,412,256 B2 * | 4/2013 | Lee | H04W 52/243 370/315 |
| 8,725,079 B2 | 5/2014 | Wang Helmersson et al. | |
| 9,191,850 B2 * | 11/2015 | Lee | H04W 24/04 |
| 9,198,141 B2 | 11/2015 | Papasakellariou et al. | |
| 2006/0046765 A1 * | 3/2006 | Kogure | H04W 52/28 455/522 |
| 2006/0093026 A1 | 5/2006 | Montojo et al. | |
| 2008/0075033 A1 | 3/2008 | Shattil | |
| 2008/0233992 A1 | 9/2008 | Oteri et al. | |
| 2009/0186648 A1 | 7/2009 | Larsson | |
| 2010/0144338 A1 | 6/2010 | Kim et al. | |
| 2010/0254276 A1 | 10/2010 | Nishikawa et al. | |
| 2011/0149769 A1 | 6/2011 | Nagaraja | |
| 2011/0244866 A1 | 10/2011 | Yamamoto et al. | |
| 2012/0087334 A1 | 4/2012 | Suzuki et al. | |
| 2012/0120806 A1 | 5/2012 | Jeon et al. | |
| 2012/0202504 A1 * | 8/2012 | Wegmann | H04W 16/08 455/438 |
| 2012/0230201 A1 | 9/2012 | Thota et al. | |
| 2013/0039286 A1 | 2/2013 | Larsson et al. | |
| 2013/0210341 A1 * | 8/2013 | Kiyoshima | H04W 52/241 455/15 |
| 2014/0126557 A1 | 5/2014 | Kasslatter et al. | |
| 2014/0219152 A1 | 8/2014 | Anto et al. | |
| 2014/0269597 A1 * | 9/2014 | Park | H04J 11/005 370/329 |
| 2014/0286219 A1 | 9/2014 | Siomina et al. | |
| 2014/0286283 A1 | 9/2014 | Kim et al. | |
| 2015/0223113 A1 | 8/2015 | Matsunaga | |
| 2016/0173148 A1 * | 6/2016 | Kazmi | H04W 52/244 455/296 |

FOREIGN PATENT DOCUMENTS

| | | |
|---|---|---|
| JP | 2002-77042 A | 3/2002 |
| JP | 2008-147835 A | 6/2008 |
| KR | 10-2010-0066898 A | 6/2010 |
| KR | 10-2010-0128972 A | 12/2010 |
| KR | 10-2011-0136424 A | 12/2011 |
| WO | 2012/175146 A1 | 12/2012 |
| WO | 2014/034118 A1 | 3/2014 |
| WO | 2013/161793 A1 | 12/2015 |

OTHER PUBLICATIONS

Japanese Office Action dated Mar. 4, 2019, issued in Japanese Application No. 2016-566235.
Chinese Office Action dated Mar. 12, 2019, issued in Chinese Application No. 201580022246.1.

* cited by examiner

METHOD AND DEVICE FOR REAL TIME TRANSMISSION POWER CONTROL IN WIRELESS COMMUNICATION SYSTEM

CROSS-REFERENCE TO RELATED APPLICATION(S)

This application is a continuation application of prior application Ser. No. 14/699,210, filed on Apr. 29, 2015, which has issued as U.S. Pat. No. 10,292,118 on May 14, 2019, which claimed the benefit under 35 U.S.C. § 119(a) of a Korean patent application filed on May 2, 2014 in the Korean Intellectual Property Office and assigned Serial number 10-2014-0053271, the entire disclosure of which is hereby incorporated by reference.

TECHNICAL FIELD

The present disclosure relates to a wireless communication system. More particularly, the present disclosure relates to a method and device for real time transmission power control in a wireless communication system.

BACKGROUND

Typically, a wireless communication system has been developed to provide voice services while ensuring the mobility of users. The wireless communication system has gradually expanded its service scope from voice to data services. In recent years, the wireless communication system has evolved to a degree that it can provide high-speed data services. However, currently, the wireless communication system that provides services suffers from a lack of resources, and users require the wireless communication system to provide higher-speed services to them. Accordingly, there is a necessity for more advanced wireless communication systems.

Meanwhile, when installing a system (or base station) in a wireless communication system, a network operator needs to enhance the throughput of edge User Equipments (UEs) and control the load for each cell in order to ensure service qualities.

Accordingly, in a general-purpose network, there is a necessity for transmission power control methods for UE throughput performance enhancement and load balancing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for real time transmission power control in a wireless communication system.

More specifically, an aspect of the present disclosure is to provide a method and device for controlling the transmission power of a base station in real time using a Sounding Reference Signal (SRS) that a User Equipment (UE) transmits.

In accordance with an aspect of the present disclosure, a method of controlling the transmission power of a base station by a scheduler in a wireless communication system is provided. The method includes receiving transmission power control related information from at least one base station, generating transmission power control information for load balancing of the at least one base station on the basis of the transmission power control related information, and controlling transmission power of the at least one base station on the basis of the transmission power control information.

In accordance with another aspect of the present disclosure, a scheduler for controlling transmission power of a base station in a wireless communication system is provided. The scheduler includes an interface unit that transmits/receives a signal to/from the base station and a controller that receives transmission power control related information from at least one base station, generates transmission power control information for load balancing of the at least one base station on the basis of the transmission power control related information, and controls transmission power of the at least one base station on the basis of the transmission power control information.

According to the present disclosure, it is possible to control the transmission power in real time using real time Radio Frequency (RF) information and scheduling information, thereby achieving a real time load balancing effect and UE throughput enhancement in a general-purpose network.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
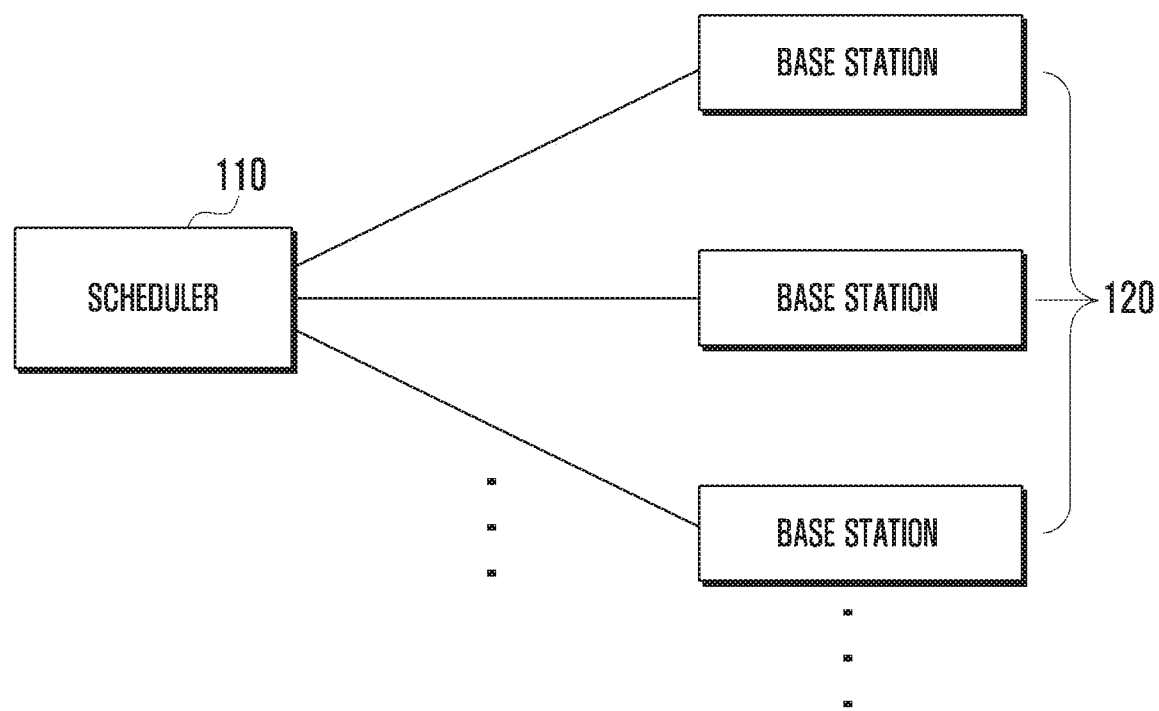
FIG. 1 is a block diagram illustrating a configuration of a wireless communication network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to various embodiments as described below in detail in conjunction with the accompanying drawings. However, the present disclosure is not limited to the various embodiments set forth below, but may be implemented in various different forms. The following various embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or 'modules' may be implemented to reproduce one or more Central Processing Units (CPUs) within a device or a security multimedia card.

A method for real time transmission power control over a cell for User Equipment (UE) throughput performance enhancement and load balancing will be hereinafter described.

Load balancing, according to the various embodiments of the present disclosure, may mean a series of processes of determining power up or power down for each cell and determining a transmission power control range for each cell for which load balancing is made, on the basis of a degree of distribution of UEs or a degree of distribution of Physical Resource Block (PRB) usage ratios for each cell depending upon a determined load balancing mode.

In addition, a base station or a cell of the present disclosure may include a small-sized base station. Furthermore, the small-sized base station may include a pico base station.

Currently, a cell controls the transmission power of each base station using loading information for a predetermined period. However, such a method is suitable for transmission power control for making up for a coverage hole and transmission power control for solving multi-cell overlay. In this case, the cell performs the above operation after the analysis using statistics for a predetermined period.

However, according to the above method, since the statistics for a predetermined period are used, a limitation cannot be avoided in obtaining a performance gain in a general-purpose network in which UEs continue to move.

In order to solve the problem, the present disclosure performs transmission power control reflecting real time developing situations on the basis of the real time Radio Frequency (RF) information and scheduling information acquired through an integrated scheduler (or scheduler). Therefore, according to the present disclosure, it is possible to enhance a load balancing effect and UE throughput performance.

Hereinafter, various embodiments of the present disclosure will be described with reference to the accompanying drawings.

FIG. 1 is a block diagram illustrating a configuration of a wireless communication network according to an embodiment of the present disclosure.

Referring to FIG. 1, the wireless communication network, according to the embodiment of the present disclosure, may include an integrated scheduler 110 and at least one base station 120.

The integrated scheduler (or scheduler) 110 receives transmission power control related information from the at least one base station 120. The base station 120 may collect information required for a transmission power control algorithm performance period and transfer the collected information to the scheduler 110.

Then, the scheduler 110 may control transmission power in order to enhance a UE throughput using the collected information from the base station 120.

Figure 2:
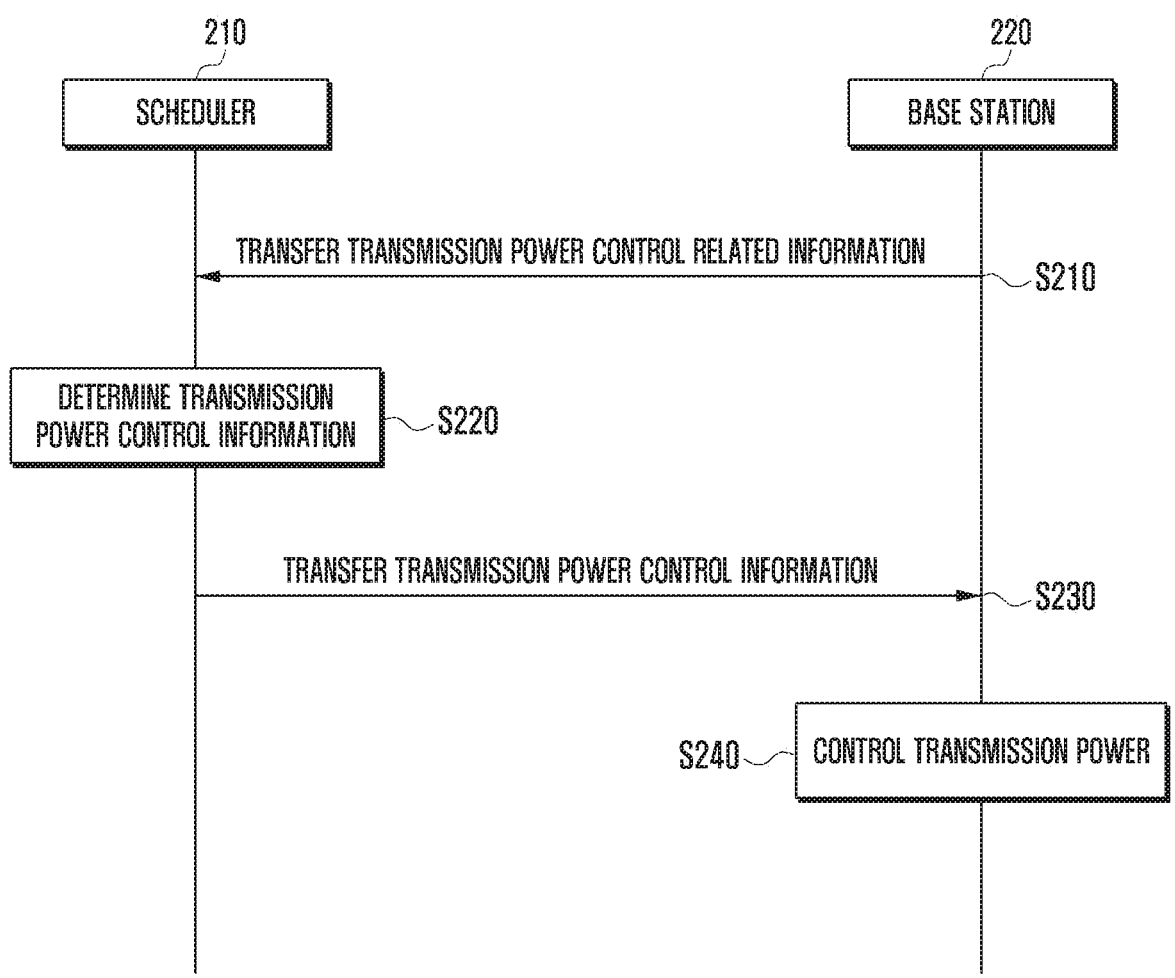
FIG. 2 is a signal flow diagram illustrating a transmission power control process according to an embodiment of the present disclosure.

FIG. 2 is a signal flow diagram illustrating a transmission power control process according to an embodiment of the present disclosure.

Referring to FIG. 2, a scheduler 210 may receive transmission power control related information from a base station 220 in operation S210. The scheduler 210 and the base station 220 may be connected to each other through a wired or wireless interface. Although the transmission power control related information may include IDs, PRB usage ratios, and Noise and Interference (NI) prediction information of connected UEs, the number of connected UE IDs for a sub-cell, a PRB usage ratio of the sub-cell, handover related information, and the like, the transmission power control related information is not necessarily limited to the listed information. The transmission power control related information will be specifically described through FIG. 3.

In operation S220, the scheduler 210 determines transmission power control information on the basis of the transmission power control related information received from the base station 220. The transmission power control information may include information on an increase or decrease in power for each base station and the degree thereof.

In operation S230, the scheduler 210 transfers the determined transmission power control information to the base station 220.

Then, in operation S240, the base station 220 controls transmission power on the basis of the transmission power control information received from the scheduler 210.

Figure 3:
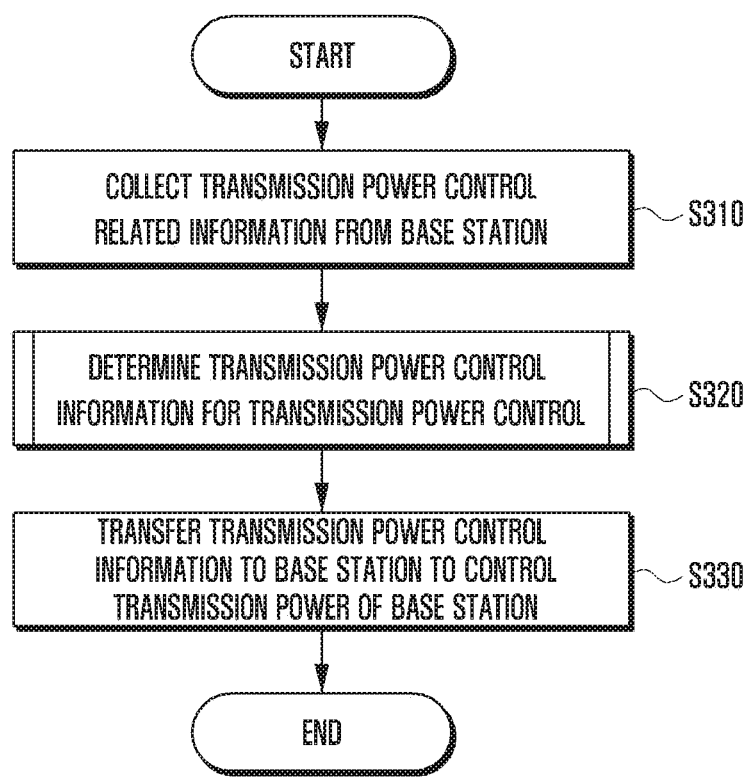
FIG. 3 is a flowchart illustrating a process in which a scheduler determines transmission power control information to be applied to each base station according to an embodiment of the present disclosure.

FIG. 3 is a flowchart illustrating a process in which a scheduler determines transmission power control information to be applied to each base station according to an embodiment of the present disclosure.

First, in operation S310, the scheduler may collect (or receive) transmission power control related information from at least one base station. The transmission power control related information which the scheduler collects is as follows.

The transmission power control related information may include IDs, PRB usage ratios, and NI prediction values of connected UEs. In addition, the transmission power control related information may further include the number and PRB usage ratios of connected UEs for a sub-cell of a particular base station. Furthermore, the transmission power control related information may further include handover related parameters.

In order to transfer the transmission power control related information to the scheduler, the base station may collect the transmission power control related information through the following processes.

First, the base station may manage a list of connected UEs. For example, the base station may manage a connected UE list of a sub-cell, which the base station itself currently manages, for $T_{TLM\_TPC}$ and store the connected UE list in the sub-cell at the expiration time point of the $T_{TLM\_TPC}$ timer. In this case, the connected UEs may mean UEs that are now in a~~(RRC) connection state.

In addition, the base station may collect PRB usage ratios of the connected UEs. For example, the base station may collect the PRB usage ratios of the connected UEs for $T_{TLM\_TPC}$ through the following processes:

1) Initialize AvgUEPRBUsageRatio for connected UEs at the start of a $T_{TLM\_TPC}$ timer.
2) Initialize UEPRBUsageRatio for the connected UEs at the start of a $T_{SCH\_INFO}$ timer.
3) Perform the following operations targeting the connected UEs at every TTI for $T_{SCH\_INFO}$.
   3-1) Set NumUEPRB=0 for the connected UEs
   3-2) Set the number of PRBs allocated to the corresponding connected UEs in a scheduling process
   3-3) Update UEPRBUsageRatio for the connected UEs as follows:
      UEPRBUsageRatio+=NumUEPRB/$T_{SCH\_INFO}$/ Total_NUM_PRB
4) Update AvgPRBUsageRatio for the connected UEs based on the information collected for $T_{SCH\_INFO}$ through the process 3) as follows:
   AvgSubCellPRBUsageRatio+=UEPRBUsageRatio/$N_{avg\_sample}$
   The above satisfies $N_{avg\_sample}$ $T_{TLM\_TPC}=T_{SCH\_INFO}*N_{avg\_sample}$.
5) Repeat the processes 2) to 4) until the expiry of the $T_{TLM\_TPC}$ timer and thereafter store AvgPRBUsageRatio for the connected UEs.

Furthermore, the base station may collect the PRB usage ratio of the sub-cell. To this end, the base station may collect the PRB usage ratio for each sub-cell, which the base station itself manages, for $T_{TLM\_TPC}$ through the following sequence.

1) Initialize AvgUEPRBUsageRatio for a cell at the start of a $T_{TLM\_TPC}$ timer.
2) Initialize SubCellPRBUsageRatio for the cell at the start of a $T_{SCH\_INFO}$ timer.
3) Store the number of PRBs (NumCellPRB) allocated to a UE by a sub-cell at every TTI for $T_{SCH\_INFO}$ and update CellPRBUsageRatio as follows:
   CellPRBUsageRatio+=NumCellPRB/$T_{SCH\_INFO}$/ Total_NUM_PRB 4) Update AvgPRBUsageRatio for each sub-cell on the basis of the information collected for $T_{SCH\_INFO}$ through the process 3) as follows:

AvgSubCellPRBUsageRatio+=CellPRBUsageRatio/$N_{avg\_sample}$

The above satisfies $N_{avg\_sample}$ $T_{TLM\_TPC}=T_{SCH\_INFO}*N_{avg\_sample}$.

5) Repeat the processes 2) to 4) until the expiry of the $T_{TLM\_TPC}$ timer and thereafter store AvgPRBUsageRatio for the sub-cell.

Moreover, the base station may collect handover (HO) related parameters of a cell. For example, the base station may collect handover parameters for each cell, which the base station itself manages, for $T_{TLM\_TPC}$ through the following processes.

1) Collect the following HO related parameters of a cell for $T_{TLM\_TPC}$.

Off$_j$: offset of event A3 of the jth cell
Hysteresis$_j$: hysteresis of event A3 of the jth cell
Ofs$_j$: frequency-specific offset of the jth cell
Ocs$_j$: cell-specific offset of the jth cell
Ofn$_{j,r}$: frequency-specific offset of the rth Sounding Reference Signal (SRS) neighbor of the jth cell
Ocn$_{j,r}$: cell-specific offset of the rth SRS neighbor of the jth cell 2) Store the HO related parameters of the cell collected in the process 1) at the expiry of the $T_{TLM\_TPC}$ timer.

The scheduler collects the transmission power control related information which the base station has collected through the processes. Then, in operation S320, the scheduler may determine transmission power control information for transmission power control over the at least one base station.

In operation S330, the scheduler transfers the transmission power control information to the base station to control the transmission power of the base station.

A real time load balancing effect and UE throughput enhancement can be achieved in a general-purpose network by performing the processes.

Hereinafter, a specific process in which the scheduler determines the transmission power control information for power transmission control in operation S320 of FIG. 3 will be described.

Prior to the description of the process, a process of determining NI by the scheduler will be described through FIG. 4. The NI may be used as an input parameter of an objective function that is used to determine the transmission power control information.

Figure 4:
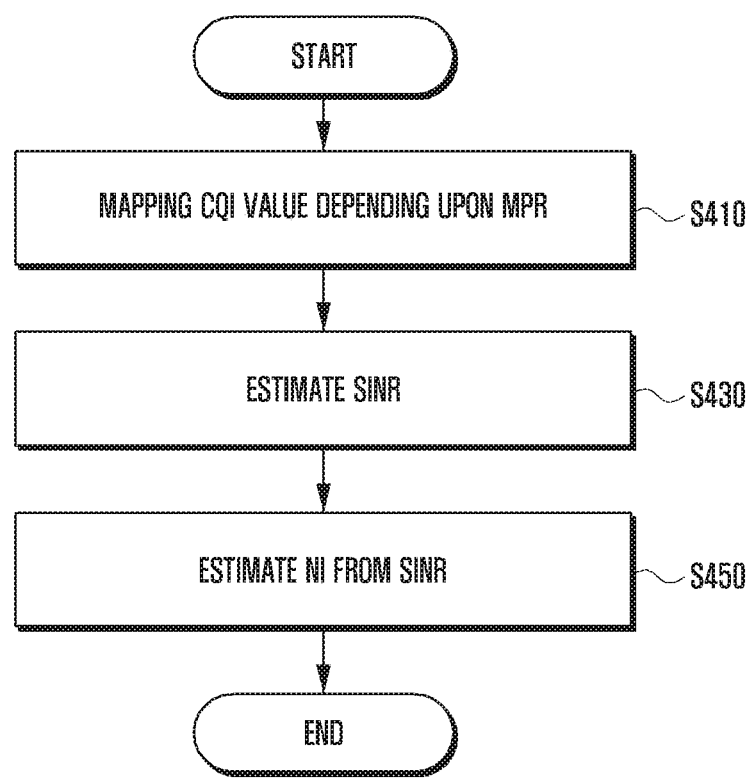
FIG. 4 is a flowchart illustrating a process of determining Noise and Interference (NI) by the scheduler according to an embodiment of the present disclosure.

FIG. 4 is a flowchart illustrating a process of determining NI by the scheduler according to an embodiment of the present disclosure.

The scheduler may estimate NI using the average Maximum Power Reduction (MPR) to Channel Quality Indicator (CQI) and the average Rank Indicator (RI) of an active UE that are received from the base station.

First, in operation S410, the scheduler may map a CQI value depending upon MPR. For example, the CQI value may be determined between 0 and 15 depending upon the magnitude of the MPR.

In operation S430, the scheduler may estimate a Signal to Interference Noise Ratio (SINR) on the basis of the deduced CQI value.

In operation S450, the scheduler may estimate NI on the basis of the estimated SINR.

In this case, according to an embodiment of the present disclosure, the scheduler may estimate the NI on the basis of the estimated SINR and SRS reception power that the base station receives from the UE.

For example, the scheduler may estimate an SINR on the basis of a CQI value mapped depending upon MPR. The scheduler may identify a reception power value for an SRS that a serving cell receives for a particular UE, and a reception power value for an SRS that an interference cell to the UE receives from the UE.

The reception power value for the SRS that the serving cell receives for the particular UE is S of the SINR (reception signal strength of the serving cell), and the reception power value for the SRS that the interference cell to the UE receives from the UE is I (interference) of the SINR.

Accordingly, the scheduler may obtain the remaining N (noise) on the basis of the estimated SINR, and the S and I, which are the reception power values, from the SRS of the UE.

Through the processes, the scheduler may estimate NI.

The NI calculated through the processes may henceforward be used as an input parameter of an objective function that is used to determine transmission power control information, and a specific description thereof will be given in detail in the corresponding section.

Hereinafter, a process in which the scheduler determines transmission power control information for transmission power control of each base station will be described through FIG. 5.

Figure 5:
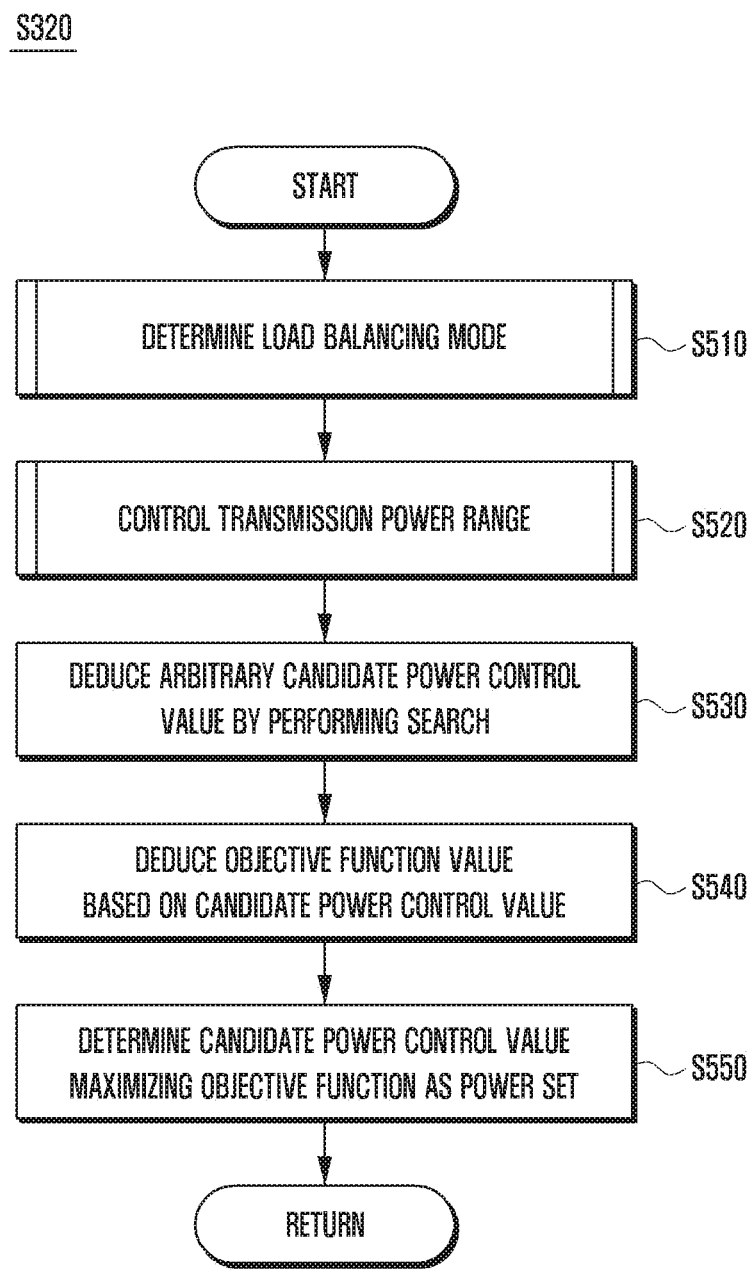
FIG. 5 is a flowchart illustrating a specific process in which the scheduler, according to the embodiment of the present disclosure, performs at operation S320 illustrated in FIG. 3.

FIG. 5 is a flowchart illustrating a specific process in which the scheduler, according to the embodiment of the present disclosure, performs at operation S320 illustrated in FIG. 3.

The scheduler determines transmission power for all ---(RRHs) (or base stations, antennas, and transmission points) that the scheduler itself manages, using the information collected from the base station and SRS reception power of UEs received by the base station.

In the RRH transmission power determining process, the scheduler may determine the RRH transmission power to maximize an objective function while achieving a load balancing effect in terms of PRB usage ratios or the number of UEs.

Referring to FIG. 5, a process of determining transmission power for each RRH (or base station) will be described according to the following sequence.
1) Determine a load balancing mode.
2) Determine an RRH transmission power control range for load balancing.
3) Define an objective function.
4) Calculate RRH transmission power through a search algorithm.

Specific contents of the respective processes will be described with reference to FIG. 5.

First, in operation S510, the scheduler may determine a load balancing mode.

The load balancing mode, according to the embodiment of the present disclosure, may include an inter-cell load balancing mode in terms of PRB usage ratios and an inter-cell load balancing mode in terms of the number of active UEs. The inter-cell load balancing mode in terms of the PRB usage ratios may mean balancing a PRB usage distribution for each cell using a PRB usage distribution, and the inter-cell load balancing mode in terms of the number of active UEs may mean balancing an active UE distribution for each cell using a UE distribution.

The inter-cell load balancing mode in terms of the PRB usage ratios may mean a mode for performing load balancing on the basis of PRB usage ratios used by respective cells.

For example, the number of PRBs used by a second base station may be increased to be greater than that used by a first base station.

In the inter-cell load balancing mode in terms of the number of active UEs, for example, the transmission power of a second base station may be increased such that the second base station may service UEs at a cell edge between a first base station and the second base station.

The scheduler may determine a load balancing mode to be used in the transmission power determining process of the base station (RRH) on the basis of the PRB usage ratios for respective cells collected from the base station and the number of active UEs.

For example, the load balancing mode may be basically set as the load balancing mode based on the number of UEs. In addition, when a PRB usage ratio for any one base station is smaller than or equal to a preset reference, the load balancing mode may be selected to be the PRB based load balancing mode.

Figure 6:
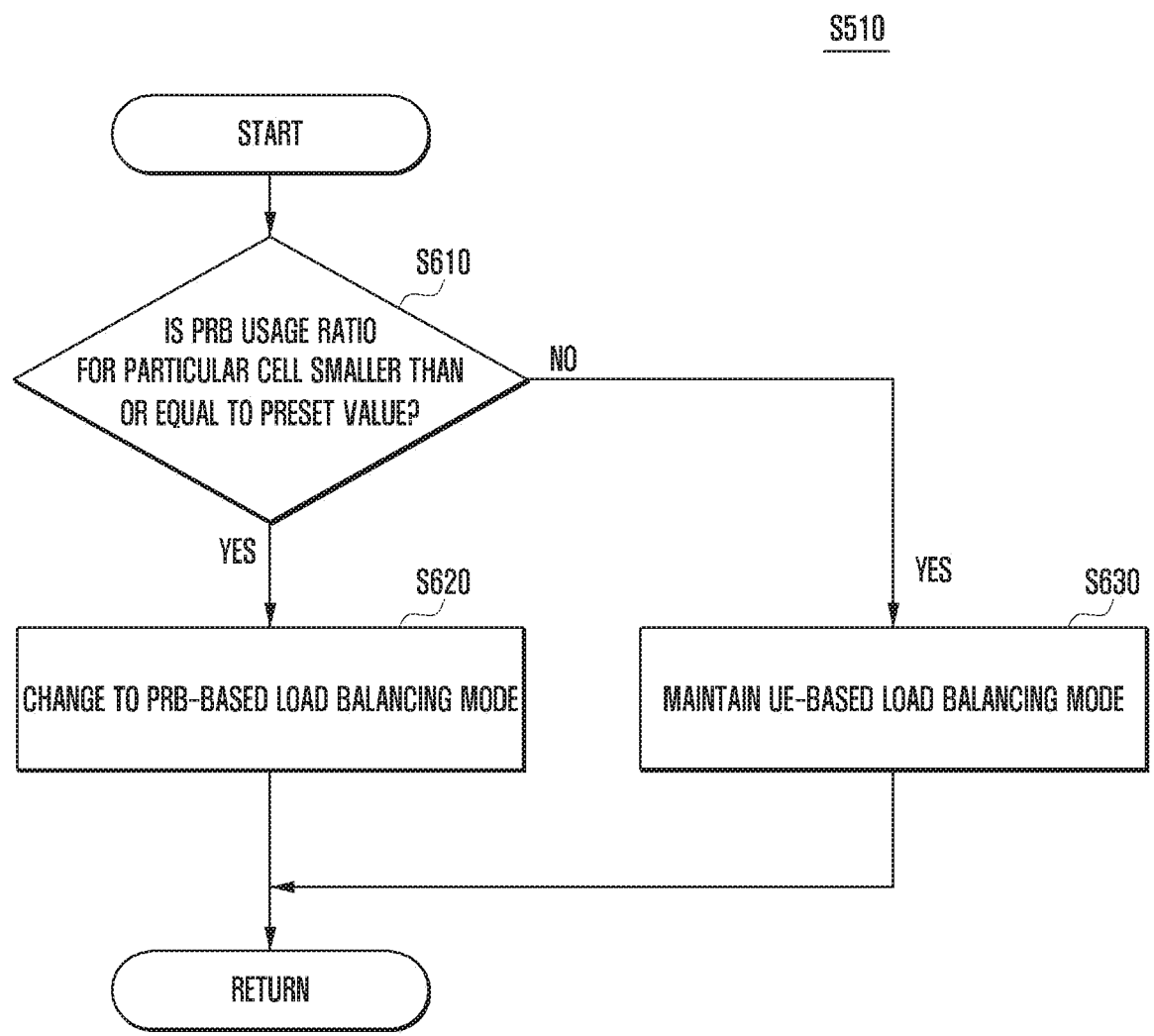
FIG. 6 is a flowchart illustrating a process of determining a load balancing mode by the scheduler according to an embodiment of the present disclosure, performs operation S510 illustrated in FIG. 5.

A specific operating procedure of determining a load balancing mode by the scheduler is illustrated in FIG. 6.

FIG. 6 is a flowchart illustrating a specific process of performing an operation S510 as illustrated in FIG. 5 according to an embodiment of the present disclosure.

First, in operation S610, the scheduler determines whether a PRB usage ratio for any one cell is smaller than or equal to a preset reference value. When it is determined that the PRB usage ratio for the cell is smaller than or equal to the preset reference value, the scheduler may proceed to operation S620 to determine the load balancing mode to be the PRB base load balancing mode.

In other cases, the scheduler may determine the load balancing mode to be the UE based load balancing mode as in operation S630.

Returning to the description of FIG. 5 again, the scheduler may control a transmission power range in operation S520. In order to control the transmission power range, the scheduler determines the minimum power value necessary for load balancing and determines whether to increase or decrease the transmission power for each cell. The scheduler determines the transmission power control range for each cell.

The process of determining the transmission power range by the scheduler will be specifically described below.

First, in cases where the determined load balancing mode is the UE-based load balancing mode, the scheduler may identify the following information.

1. Information on the mean of the number of active UEs of an active cell within the scheduler.

2. Information on the variance of the number of active UEs of the active cell within the scheduler.

Furthermore, in cases where the determined load balancing mode is the PRB-based load balancing mode, the scheduler may identify the following information.

1. Information on the mean of the PRB usage ratios of the active cell within the scheduler.

2. Information on the variance of the PRB usage ratios of the active cell within the scheduler.

The scheduler may determine a power gap required for the occurrence of handover for each active UE. In this case, the scheduler may determine the power gap on the basis of the SRS reception power of a serving cell for a particular UE, the current transmission power of the serving cell, the SRS reception power of the best neighbor cell for the particular UE, and the current transmission power of the best neighbor cell.

Here, the best neighbor cell may mean a cell that has the smallest difference in reception power between itself and the serving cell.

Next, the scheduler may determine transmission power up/down for each base station (or cell).

In cases where the load balancing mode is the UE-based load balancing mode, the scheduler may determine transmission power up/down for each cell on the basis of the information on the mean of the number of active UEs of the active cell within the scheduler, the information on the variance of the number of active UEs of the active cell within the scheduler, and the like.

Meanwhile, in cases where the load balancing mode is the PRB-based load balancing mode, the scheduler may determine the transmission power up/down for each cell on the basis of the information on the mean of the PRB usage ratios of the active cell within the scheduler, the information on the variance of the PRB usage ratios of the active cell within the scheduler, and the like.

The scheduler having determined the transmission power up/down may set a transmission power control range for each base station (or cell). In this case, the scheduler may set the transmission power control range for each base station (or cell) on the basis of at least one of the transmission up/down and the power gap which have been previously determined.

Conceptually, a base station (or cell) requiring the transmission power down for load balancing may set the transmission power range to a lower level than the current transmission power in view of a handover margin. In addition, a base station (or cell) requiring the transmission power up for load balancing may set the transmission power range to a higher level than the current transmission power in view of a handover margin.

A specific process of performing the operation S520 of FIG. 5 described above is illustrated in FIG. 7.

Figure 7:
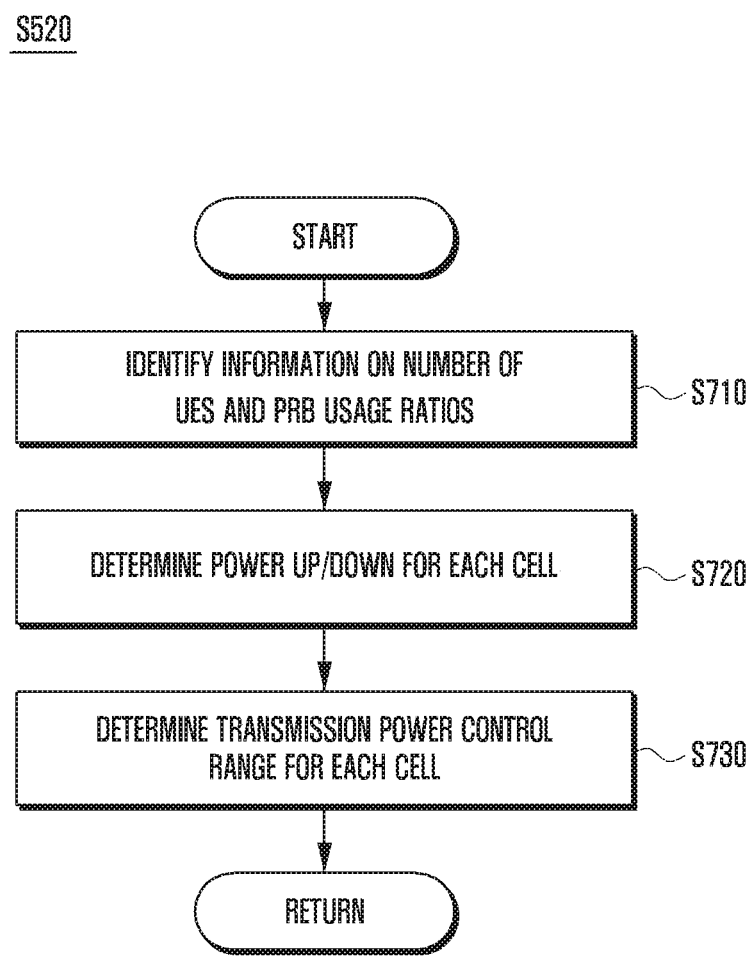
FIG. 7 is a flowchart illustrating a specific process of performing operation S520 illustrated in FIG. 5 according to an embodiment of the present disclosure.

FIG. 7 is a flowchart illustrating a specific process of performing operation S520 illustrated in FIG. 5 according to an embodiment of the present disclosure.

Specifically, in operation S710, the scheduler may identify information on the number of UEs or PRB usage ratios. For example, in cases where the determined load balancing mode is the UE-based load balancing mode, the scheduler may identify the information on the mean of the number of active UEs of the active cell within the scheduler and the information on the variance of the number of active UEs of the active cell within the scheduler.

Furthermore, in cases where the determined load balancing mode is the PRB-based load balancing mode, the scheduler may identify the information on the mean of the PRB usage ratios of the active cell within the scheduler and the information on the variance of the PRB usage ratios of the active cell within the scheduler.

In operation S720, the scheduler may determine transmission power up/down for each cell based on the identified information.

In operation S730, the scheduler may determine a transmission power control range for each cell on the basis of the determined transmission power up/down for each cell and a power gap required for the occurrence of handover for each active UE.

Again, returning to FIG. 5, the description thereof will be made.

The scheduler, having determined the load balancing mode and the transmission power range, may determine transmission power control information to be actually applied to each base station in the operations following operation S530. In other words, since the transmission power control range determined in the foregoing operations is only candidate power control values for transmission power control over each base station, a transmission power control value to be actually applied to each base station may be determined through processes of performing a search algorithm targeting the candidates and calculating an objective function.

To this end, the objective function will be defined first.

In a full loading environment, when scheduling is performed according to the Proportional Fairness (PF) metric, a determination may be made to optimize the network metric like Equation 1 below.

$$NetworkMetric = \sum_{j=0}^{N_{CellperNet}-1} \sum_{m=0}^{N_{UEj}-1} \log(Tput_{m,j}) \quad \text{Equation 1}$$

In Equation 1 above, $Tput_{mj}$ denotes the throughput of the mth UE of the jth cell, and $N_{UEj}$ is the number of serving UEs within the jth cell. $N_{CellperNet}$ is the number of all cells in a network.

The network metric of Equation 1 may denote the sum of the throughput for each cell and each UE.

Therefore, when the transmission power of a base station (or cell or RRH) is controlled to maximize Equation 1, it is possible to enhance UE throughput performance in a system using the PF metric as a scheduling metric.

An objective function to be used in a TLM TPC algorithm may be induced from Equation 1.

First, in the full loading environment, when it is assumed that UEs in a cell equally use resources, UE throughput may be simplified like Equation 2 below.

$$Tput_{m,j} = \frac{Capacity\ (SINR_{m,j})}{N_{ActiveUE,j}} \quad \text{Equation 2}$$

The meaning of Equation 2 may mean a capacity inferred from an SINR for the number of active UEs for each cell.

In Equation 2 above, $T_{putmj}$ denotes the throughput of the mth UE of the jth cell, and $N_{ActiveUEj}$ is the number of active UEs within the jth cell. $SINR_{mj}$ denotes the SINR of the mth UE of the jth cell, and $Capacity(SINR_{m,j})$ denotes the capacity of the mth UE of the jth cell.

In this case, S of the SINR, corresponding to a reception signal, may be deduced from the SRS received from the UE. NI of the SINR, corresponding to interference and noise, may be deduced through FIG. 4 described above.

By substituting Equation 2 into Equation 1, an objective function to be used in the TLM TPC algorithm may be defined like Equation 3 below.

$$ObjectiveFunction = \quad \text{Equation 3}$$

$$\sum_{j=0}^{N_{CellperNet}-1} \sum_{m=0}^{N_{ActiveUE,j}-1} \log\left(\frac{Capacity\ (SINR_{m,j})}{N_{ActiveUE,j}}\right)$$

In Equation 3 above, $SINR_{m,j}$ denotes the SINR of the mth UE of the jth cell, and $Capacity(SINR_{m,j})$ denotes the capacity of the mth UE of the jth cell. $N_{ActiveUEj}$ is the number of active UEs in the jth cell. $N_{CellperSch}$ is the number of all cells in the scheduler.

In the embodiment of the present disclosure, a power set to maximize the objective function is determined, and transmission power of each base station is controlled depending upon the determined power set.

In this case, power information for each base station, which will be input to the objective function, may be deduced by performing a search algorithm within the transmission power control range.

It should be noted that the search algorithm may use Tabu search according to an embodiment of the present disclosure, but is not necessarily limited thereto.

Returning to the description of FIG. 5, in operation S530, the scheduler performs a search algorithm to deduce candidate power control values, which will be input to the objective function, within the transmission power control range for each base station. In operation S540, the scheduler inputs the deduced candidate power control values into the objective function to deduce objective function results corresponding to the respective candidate power control values.

Thereafter, in operation S550, the scheduler may determine a candidate power control value, which maximizes the objective function value, as a power set to be applied to each base station.

Deduced through the above processes, examples of the transmission power control information according to the embodiment of the present disclosure, namely the power set, are listed in Table 1 below.

TABLE 1

| Cell | Power set | Transmission power control range |
|---|---|---|
| 1 | 36 | 36~46 |
| 2 | 46 | 46~56 |
| 3 | 43 | 40~44 |
| — | — | — |
| — | — | — |

The foregoing processes will be described with reference to Table 1 above. The scheduler may determine candidate power control values, which will be input into an objective function, by performing a search algorithm within the transmission power control range. The scheduler may input the determined candidate power control values into the objective function and determine candidate power control values, having the largest objective function value, as a power set to be applied to each cell.

Figure 8:
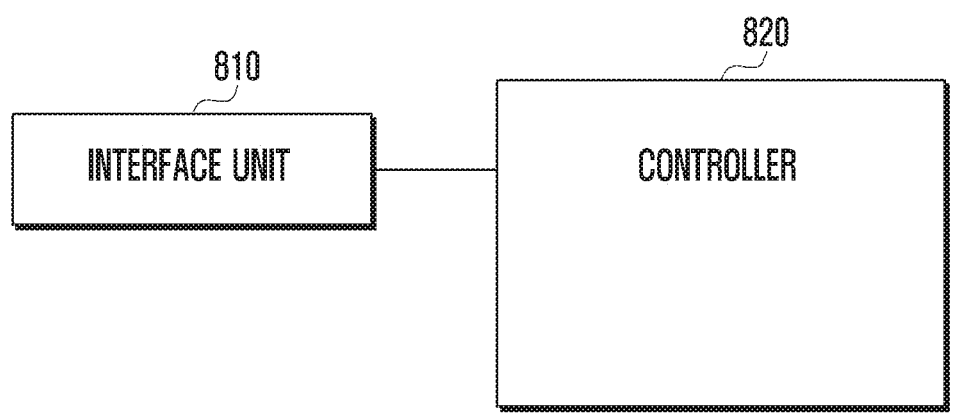
FIG. 8 is a block diagram illustrating an internal configuration of a scheduler according to an embodiment of the present disclosure.

FIG. 8 is a block diagram illustrating an internal configuration of a scheduler according to an embodiment of the present disclosure.

Referring to FIG. 8, the scheduler according to the present disclosure may include an interface unit 810 and a controller 820.

The interface unit 810 may be connected to at least one based station in a wired or wireless manner to transmit and receive a signal. According to the embodiment of the present disclosure, the interface unit 810 may receive transmission power control information from the at least one base station.

The controller 820 may control a signal flow between blocks to allow the scheduler to operate according to the embodiment of the present disclosure. Specifically, the controller 820 may make a control to receive transmission power control related information from at least one base station and to generate transmission power control information for load balancing of the at least one base station on the basis of the transmission power control related information. In addition, the controller 820 may control the transmission power of the at least one base station on the basis of the transmission power control information.

According to an embodiment of the present disclosure, the controller 820 may make a control to determine a load balancing mode for load balancing of the at least one base station on the basis of a Physical Resource Block (PRB) usage ratio for each base station and the number of active UEs and to control the transmission power range for the at least one base station according to the determined load balancing mode. In addition, the controller 820 may determine whether a PRB usage ratio for an arbitrary base station is smaller than or equal to a preset reference value, and if so, may make a control to change a UE-base load balancing mode into a PRB-based load balancing mode.

Further, when it is determined that the PRB usage ratio for the arbitrary base station is larger than the preset reference value, the controller 820 may make a control to maintain the UE-based load balancing mode.

Furthermore, the controller 820 may make a control to determine power up or power down for at least one base station and to determine the transmission power control range for the at least one base station on the basis of the power up or the power down.

Moreover, the controller 820 may deduce at least one candidate power control value to be applied to the at least one base station on the basis of the determined load balancing mode and transmission power range. The controller 820 may determine a power set, maximizing a predetermined objective function, on the basis of the deduced candidate power control value and control the transmission power of the at least one base station on the basis of the determined power set.

According to the above-described embodiment of the present disclosure, it is possible to control transmission power in real time using real time RF information and scheduling information. In this way, it is possible to obtain a real time load balancing effect in a general-purpose network. Furthermore, it is possible to enhance UE throughput by controlling interference between a base station and a UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling transmission power by a base station in a wireless communication system, the method comprising:
receiving information associated with interference of a user equipment (UE);
transmitting transmission power control related information including the information associated with the interference;
receiving, by the base station, transmission power control information generated based on the transmission power control related information; and
controlling the transmission power of the base station based on the transmission power control information.

2. The method of claim 1, wherein the information is associated with a sounding reference signal which is transmitted from the UE.

3. The method of claim 1, wherein the transmission power control information includes information on a transmission power control range for the base station.

4. The method of claim 3, wherein the information on the transmission power control range is associated with a power up or a power down for the base station.

5. The method of claim 1, further comprising:
controlling interference between one or more cells associated with the base station by controlling the transmission power of the base station according to the transmission power control information.

6. The method of claim 1, wherein the transmission power control related information includes handover related parameters.

7. A base station for controlling transmission power in a wireless communication system, the base station comprising:
a transceiver; and
at least one processor configured to:
receive information associated with interference of a user equipment (UE),
transmit transmission power control related information transmission power control related information including the information associated with the interference,
receive transmission power control information generated based on the transmission power control related information, and
control the transmission power based on the transmission power control information.

8. The base station of claim 7, wherein the information is associated with a sounding reference signal which is transmitted from the UE.

9. The base station of claim 7, wherein the transmission power control information includes information on a transmission power control range for the base station.

10. The base station of claim 7, wherein the information on the transmission power control range is associated with a power up or a power down for the base station.

11. The base station of claim 7, wherein the at least one processor is further configured to control interference between one or more cells associated with the base station by controlling the transmission power of the base station according to the transmission power control information.

12. The base station of claim 7, wherein the transmission power control related information includes handover related parameters.

13. A base station for controlling transmission power in a wireless communication system, the base station comprising:
a transceiver; and
at least one processor configured to:
identify information associated with a resource usage,
transmit transmission power control related information including the information associated with the resource usage,
receive transmission power control information generated based on the transmission power control related information, and
control the transmission power based on the transmission power control information.

14. The base station of claim 13, wherein the information associated with the resource usage is associated with a physical resource block (PRB) usage ratio, the information being collected for a predetermined amount of time.

15. The base station of claim 13,
wherein the transmission power control information is determined based on a load balancing mode, and
wherein the load balancing mode is determined based on the information associated with the resource usage.

16. The base station of claim 13, wherein the transmission power control information includes information on a transmission power control range for the base station determined based on the load balancing mode.

17. The base station of claim 16, wherein the information on the transmission power control range is associated with a power up or a power down for the base station.

18. The base station of claim 13, wherein the transmission power control related information includes information associated with a number of UE.

19. The base station of claim 13,
wherein the transmission power control related information includes information associated with interference of a user equipment (UE), and
wherein the information is associated with a sounding reference signal which is transmitted from the UE.

20. The base station of claim 13, wherein the transmission power control related information includes handover related parameters.

\* \* \* \* \*

UNITED STATES PATENT AND TRADEMARK OFFICE
CERTIFICATE OF CORRECTION

PATENT NO. : 10,772,048 B2
APPLICATION NO. : 16/411815
DATED : September 8, 2020
INVENTOR(S) : Jisun Yoon et al.

Page 1 of 1

It is certified that error appears in the above-identified patent and that said Letters Patent is hereby corrected as shown below:

In the Claims

Claim 7, Column 14, Line 24, "transmission power control related information" should be deleted Claim 10, Column 14, Line 39, "claim 7" should read --claim 9--

Signed and Sealed this
Twenty-seventh Day of October, 2020

Andrei Iancu
*Director of the United States Patent and Trademark Office*